OR 4,032,221

T 3093T

United States Patent [19]
Bibb et al.

[11] 4,032,221
[45] June 28, 1977

[54] MOUNTING ARRANGEMENT FOR ACOUSTO-OPTIC MODULATORS

[75] Inventors: John S. Bibb, Indialantic; Elliot N. Tompkins, Melbourne Beach, both of Fla.

[73] Assignee: Harris Corporation, Cleveland, Ohio

[22] Filed: Mar. 22, 1976

[21] Appl. No.: 669,005

[52] U.S. Cl. .................................. 350/161 W
[51] Int. Cl.² ................................. G02F 1/16
[58] Field of Search ....................... 350/160, 161

[56] References Cited
UNITED STATES PATENTS 3,572,899  3/1971  Bell, Jr. .................. 350/161 W
3,765,750  10/1973  Butter ...................... 350/161 W Primary Examiner—William L. Sikes
Attorney, Agent, or Firm—Charles C. Krawczyk

[57] ABSTRACT

A mounting arrangement for positioning an acousto-optic modulator in a beam of radiation so that it is adjustable to pivot the modulator unit in a plane including the beam and thereby to accurately position the angle of entry of the beam into the modulator unit. The mounting arrangement includes a planar base member, secured at one end, and adapted to be pivoted along at least one line of flexure to control the position of the modulator relative to the beam.

12 Claims, 4 Drawing Figures

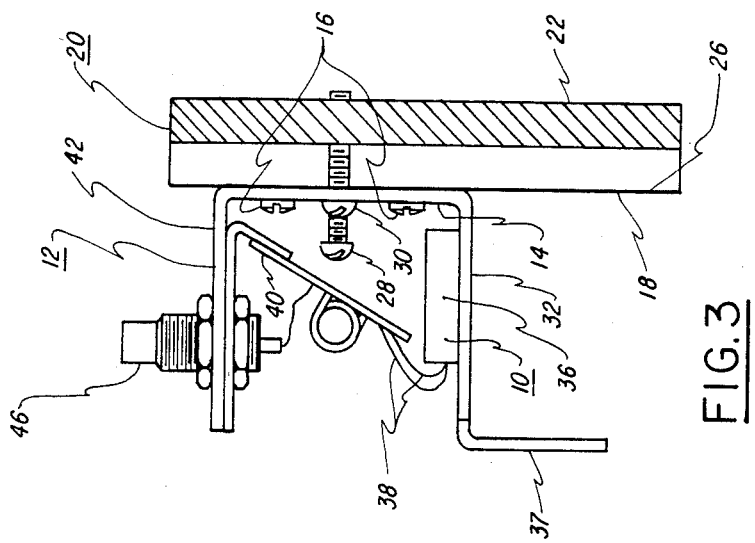
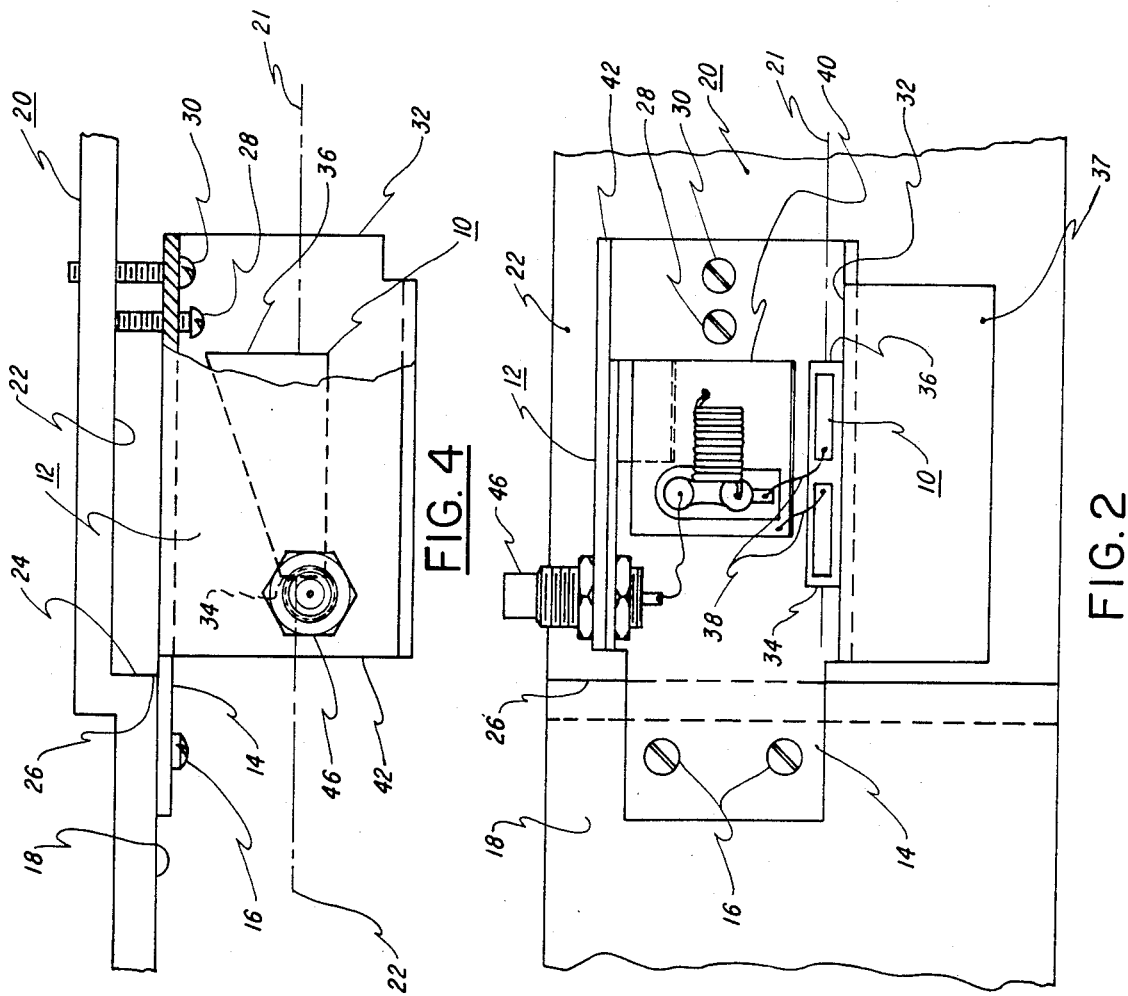

MOUNTING ARRANGEMENT FOR ACOUSTO-OPTIC MODULATORS

BACKGROUND OF THE INVENTION

Acousto-optic modulators are devices responsive to electrical signals to change the direction and intensity of the beam of radiation, such as a laser beam. Often such modulators are used to control the direction of a beam in the form of a scanner or intensity modulator. The efficiency and proper operation of such an acousto-optic modulator unit depends upon accurately controlling the angle of beam entry into the modulator to several arc minutes. This angle of entry into the modulator is called the Bragg angle. Since such acosto-optic modulator units are generally available at reasonable prices, these units are presently being considered to be used in commercial products to replace the usual mechanical scanner. However, in order to be price competitive, there is a need for a relatively simple and inexpensive mounting arrangement for the same that is readily adaptable to mass production techniques and still provide the high degree of stability and accuracy needed for mounting such modulators. In addition, such mounting arrangement also needs an adjustment scheme wherein a relatively coarse movement in the order of five degrees of rotation, that is easily detectable by a technician, is converted into a fine angular displacement, to accurately control the entry of the beam into the acousto-optic modulator.

It is therefore an object of this invention to provide a new and improved inexpensive mounting arrangement for acousto-optic modulators.

It is also an object of this invention to provide a new and improved mounting arrangement for acousto-optic modulators that includes an adjustment for accurately setting the Bragg angle beam of radiation relative to the modulator unit.

It is still a further object of this invention to provide a new and improved mounting arrangement for acousto-optic modulator units that is readily adaptable to mass production techniques.

BRIEF DESCRIPTION OF THE INVENTION

An adjustable mounting arrangement for acousto-optic modulators for accurately positioning a modulator unit into a path of a beam of radiation and for accurately controlling the angle of entry of the beam into the modulator unit. The mounting arrangement includes an elongated planar base member that is mounted at one end so that the opposite end is free for pivotal movement about a line, or alternatively about a pair of lines, located between the ends of the base member. Adjustment means are connected to the free end to control the flexure of the base member about the pivot line or lines. The acousto-optic modulator unit is mounted to the base member so that it extends into the path of a beam of radiation to be controlled. The pivotal movement of the base member about the pivot line, or lines, provides for a rotational movement of the modulator unit in a plane including the beam and thereby controlling the angle of the entry of the beam into the modulator. In the specific embodiment illustrated, the adjustment means includes a pair of screws connected as an antagonistic pair in an arrangement wherein a relatively coarse movement of the screws (in the order of five degrees) provides a very fine rotational movement of the modulator unit in the order of several arc minutes. Furthermore, the base member and the means for supporting the acousto-optic modulator can be made from sheet metal type stock in a manner that is readily adaptable to mass production techniques.

BRIEF DESCRIPTION OF THE DRAWINGS

FIG.2 is a side view of the mounting arrangement fo FIG. 1.

FIG. 3 is an end view of the mounting arrangement of FIG. 1.

FIG. 4 is a top view of the mounting arrangement of FIG. 1 with a portion cut away to illustrate the adjustment screws.

DETAILED DESCRIPTION OF THE INVENTION

Figure 1:
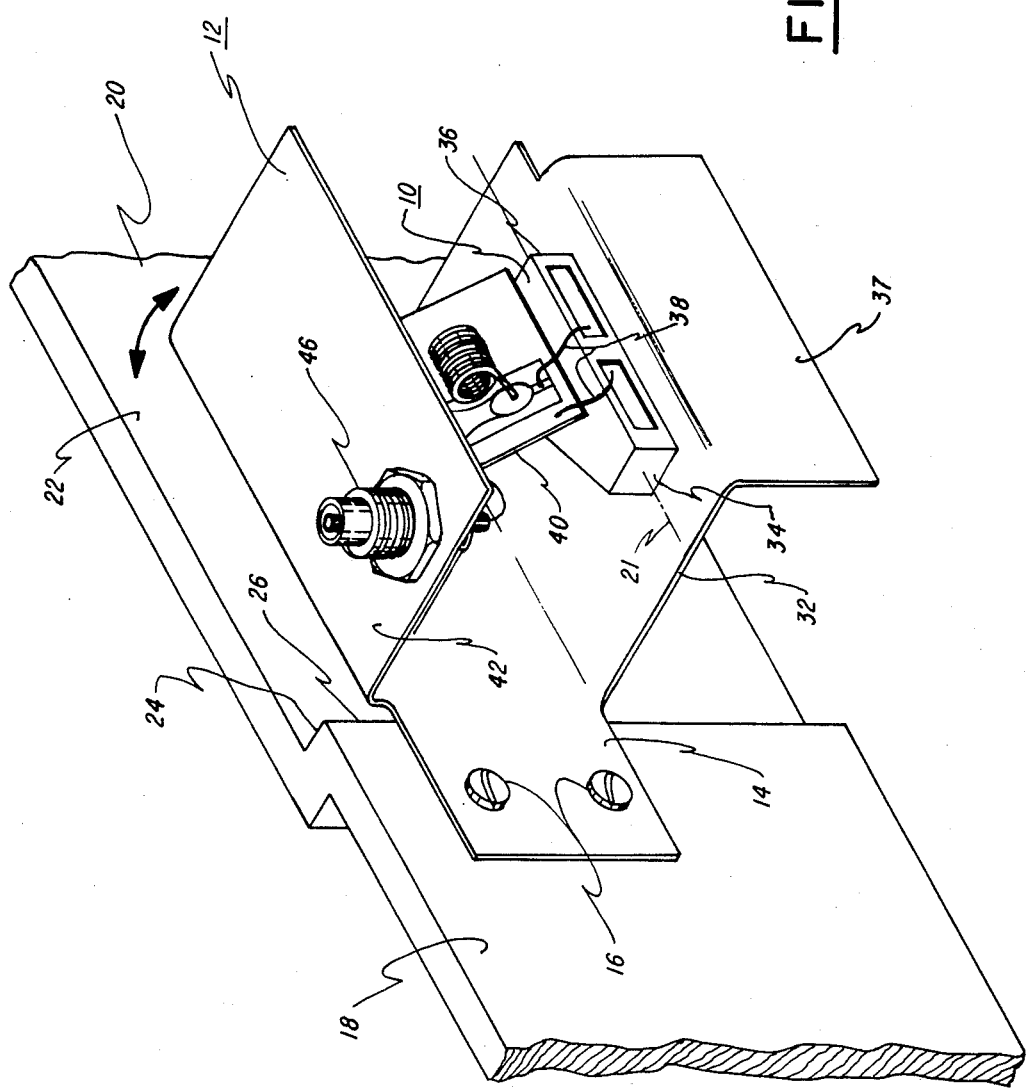
FIG. 1 is a perspective view of a mounting arrangement, including the invention, for acousto-optic modulator units, for accurately adjusting the angle of beam entry into the modulator unit.

The mounting arrangement for an optic acousto-optic modulator unit 10 includes a mount 12 having an elongated base member 14 that is adapted to be secured at one end thereof, by the screws 16, to a planar surface 18 of a chassis 20 so that the modulator 10 is located in the path of a beam of radiation 21. In the preferred embodiment, chassis 20 includes the first planar surface 18 and an indented second planar surface 22 interconnected by a leg 24. Although the surfaces or portions 18 and 22 are illustrated as having a parallel coplanar relation, it is to be understood that such surfaces need not be parallel or planar.

One end ofthe base member 14 is mounted to the planar surface 18 so that a substantial portion of the base member 14 extends beyond a right angle straight line bend 26. A pair of adjustment screws 28 and 30 extend through the base member 14 adjacent the free end of the base member 14 to engage the surface 22. The screw 28 is held in place by a threaded hole extending through the base member 14. The screw 30 extends through an aperture in the base member 14 and is held in place by a threaded hole in the mounting surface 22. The combination of the screws 28 and 30 and their threaded apertures define an antagonistic pair that can be used to pivot the base member about the bend 26 and can thereafter lock the base member 14 in the adjusted position.

The mount 12 also includes an extension 32 that extends along a plane normal to the plane of the elongated base member 14 and also normal to the bend 26. The acousto-optic modulator 10 is cemented in place on the extension 32 so that when the mount 12 is secured to the surface 18, the acousto-optic modulator 10 is positioned in the path of the beam 21 so that beam 21 enters the modulator through the surface 34 and exits through the surface 36. The extension 32 includes a leg or bend 37 to provide a larger cooling surface so that the mount 12 also functions as an effective heat sink for the modulator 10. A pair of wires 38 connect the modulator 10 to a driver circuit mounted on a printed circuit board 40 secured to another extension 42 of the mount 12. The extension 42 lies in a plane generally parallel to the extension 32, however, on the opposite side the base member 14. A connector 46 is mounted on the extension 42 and is electrically connected to the circuit on the printed circuit board 40 to provide a readily detachable electrical connection for the mount 12.

As previously mentioned, the modulator 10 is located on the extension 32 so that when mounted in place the beam enters the surface 34 and exits the surface 36. The modulator unit 10 can be so mounted so that the angle of entry of the beam 21 relative to the surface 34 is approximately correct and therefore only a slight angular displacement of the modulator is needed to precisely set the Bragg angle. Since the elongated strip portion of the base member 14 can be pivoted about the bend 26 in response to the adjustment of the screws 28 and 30, a rotational type movement is provided to set the Bragg angle. For example, if the modulator 10 is to be moved in a direction towards the surface 22, the screw 28 is loosened and the screw 30 is rotated in a direction to cause the free end of base member 14 to pivot in a direction toward the mounting surface 22. Once set, the mount 12 can be locked in place by adjusting the screw 28 to abut against the mounting surface 22. This adjustment may require several fine tuning settings to "rock" the modulator 10 into place for optium performance. If the modulator 10 is to be adjusted for movement away from the mounting surface 22, the screw 30 is loosened, and the screw 28 tightened to force the base member away from the mounting surface 22. After the adjustment is complete, the screw 30 is tightened to lock the adjustment in place. It has been found, that with a relatively coarse movement of the screws 28 and 30, in the order of five degrees, the surface 34 of the modulator 10 can be very accurately adjusted in the order several arc mintutes.

As the free end of the base member 14 pivots about the bend 26, the modulator 10 follows a circular path at a fixed radius defined by the distance between the modulator and the bend 26. Although the pivotal movement of the mount 12 provides both a rotational and translation motion of the modulator 10, since the modulator 10 is positioned approximately at its desired location, only a minor adjustment in the surface 34 is needed. Therefore only a small amount of pivotal motion of the mount 12 is necessary to provide a rotational movement in the order of several arc minutes. Hence, the translation motion is also very small and can be neglected. It can be seen by the above description that the mount 12, including the base member 14, the extensions 32 and 42, and the leg 37 can be built from sheet metal stock, as a single unit, by relatively simple stamping procedures. The mount 12 thereafter can be inserted into a jig to accurately align the extension 32 in a plane normal to the elongated base member 14. The acousto-optic modulator unit 10 can thereafter be cemented into place and the electrical circuit 40 and connector 46 connected and secured in place. The mount 12 is thereafter secured to the surface 18 by the screws 16 so that the modulator 10 extends into the path of the beam 21 approximately at the proper angle of entry. Since the extension 32 is normal to the straight line bend 26, any pivotal action about the bend 26 will move the modulator 10 along a plane including a beam 21. Hence, mounting arrangement of the invention provides a relatively low cost unit that does not require any expensive die cast components, that can be readily manufactured by mass production techniques to acceptable tolerances, and that can be simply mounted into place. The final adjustment merely includes the setting of a pair of screws 28 and 30 to peak the performance of the modulator 10.

Although the base member 14 has been illustrated as having a continuous planar shape and the chassis 20 as having two indented surfaces, it sould be understood, that as an alternative configuration, the chassis 20 can have a continuous planar surface and the base member 14 can be formed with a pair of right angle bends between the screws 16 and the extensions 32 and 42 so that separation for pivotal movement is provided by the base member 14 instead of the chassis 20. In such an arrangement that the pivotal movement will be about at least one of the pivotal lines that correspond to the right angle bends. The remainder of the structure of the mounting arrangement will remain the same.

What is claimed is:

1. A mounting arrangement for controlling the position of an acousto-optic modulator in a beam of radiation comprising in combination:
   a mounting base including a substantially planar portion and an indented portion, wherein said portions are separated by a plurality of bends:
   means for directing a beam of radiation along a path that is adjacent to said planar portion;
   a generally planar base member;
   means for securing said base member, adjacent one end thereof, to said planar surface portion in an abutting coplanar relation, between said planar portion and said beam of radiation, and with a portion of the base member extending beyond said bend;
   adjustment means connected to said member adjacent the other end of said base member and engaging said indented portion, said adjustment means being adapted to apply forces to said base member to pivot the portion of said base member extending beyond said bend, and
   means for mounting an acousto-optic modulator to said base member so that said acousto-optic modulator extends into said beam and is movable along a plane including said beam in response to said adjustment means.

2. A mounting arrangement as defined in claim 1 wherein:
   the path of said beam of radiation is in a direction substantially parallel to said planar surface and separated therefrom, and
   said acousto-optic modulator is mounted on a leg extending from said base member and at an angle substantially normal thereto.

3. A mounting arrangement as defined in claim 2 wherein:
   a driving circuit, connected to said acousto-optic modulator, is mounted to said base member, and
   a connector is mounted on another leg extending from said base member and provides for an electrical connection to said driving circuit.

4. A mounting arrangement as defined in claim 1 wherein:
   said indented portion lies in a plane to said planar surface but separated therefrom, and
   said adjustment means includes a pair of screws extending through said base member and engaging said indented portion to provide an antagonist pair.

5. An acousto-optic modulator mount for attachment to an optic system having a mounting base formed with a planar surface and an indented portion with at least one straight line end in between, and including a beam of radiation directed along a path adjacent said planar surface and the bend, said mount comprising:

a substantially planar base member adapted to be secured to said planar surface in abutting coplanar relation thereto between said planar surface and said beam and with a portion of said base member extending beyond said straight line bend;

adjustment means extending between the indented portion and said base member adjacent the end of said base member extending beyond said straight line bend and adapted to pivot the extended portion of said base member about said straight line bend;

an acousto-optic modulator, and means for mounting said acousto-optic modulator to said base member so that when said planar base member is secured to the planar surface said modulator extends into the beam and is adapted to pivot along a plane including the beam in response to the pivotal adjustment of said base member.

6. A mount as defined in claim 5 wherein:

the path of said beam of radiation is in a direction substantially parallel to said planar surface and adjacent said straight line bend, but separated therefrom, and said acousto-optic modulator is mounted on a leg extending from said base member and at an angle substantially normal thereto.

7. A mounting arrangement as defined in claim 6 wherein:

a driving circuit, connected to said acouto-optic modulator, is mounted to said base member, and a connector is mounted on another leg extending from said base member and provides for an electrical connection to said driving circuit.

8. A mount as defined in claim 5 wherein:

said indented portion lies in a plane parallel to said planar surfaces but separated therefrom, and said adjustment means includes a pair of screws extending through said base member and engaging said indented portion to provide an antagonist pair.

9. A mounting arrangement for controlling the position of an acousto-optic modulator in a beam of radiation comprising in combination:

a mounting base including a substantially plannar portion;

means for directing a beam of radiation along a path that is adjacent to said planar portion;

a planar base member formed with a pair of parallel, substantially right angle, bends;

means for securing said base member, adjacent one end thereof, to said planar surface portion in an abutting coplanar relation to said planar surface, and between said planar portion and said beam of radiation, so that the other end of said base member is separated from said mounting base;

adjustment means connected to said base member adjacent the other end of said base member and engaging said mounting base, said adjustment means being adapted to apply forces between said mounting base and said base member to pivot said base member about at least one of said bends, and means for mounting an acoustic-optic modulator to said base member so that said acousto-optic modulator extends into said beam and is movable along a plane including said beam in response to said adjustment means.

10. A mounting arrangement as defined in claim 9 wherein:

the path of said beam is in a direction substantially parallel to said planar portion and separate therefrom, and said acousto-optic modulator is mounted on a leg extending from said base member located between said bends and said adjustment means and at an angle substantially normal thereto.

11. A mounting arrangement as defined in claim 10 wherein:

a driving circuit, connected to said acousto-optic modulator, is mounted to said base member, and a connector is mounted on another leg extending from said base member and provides for an electrical connection to said driving circuit.

12. A mounting arrangement as defined in claim 9 wherein:

said adjustment means includes a pair of screws extending through said base member and engaging said mounting base to provide an antagonist pair.

* * * * *